H. W. SPELLMAN & C. E. OLMSTED.
POWER TRANSMISSION MECHANISM.
APPLICATION FILED MAR. 18, 1909.
969,214.
Patented Sept. 6, 1910.
3 SHEETS—SHEET 1.
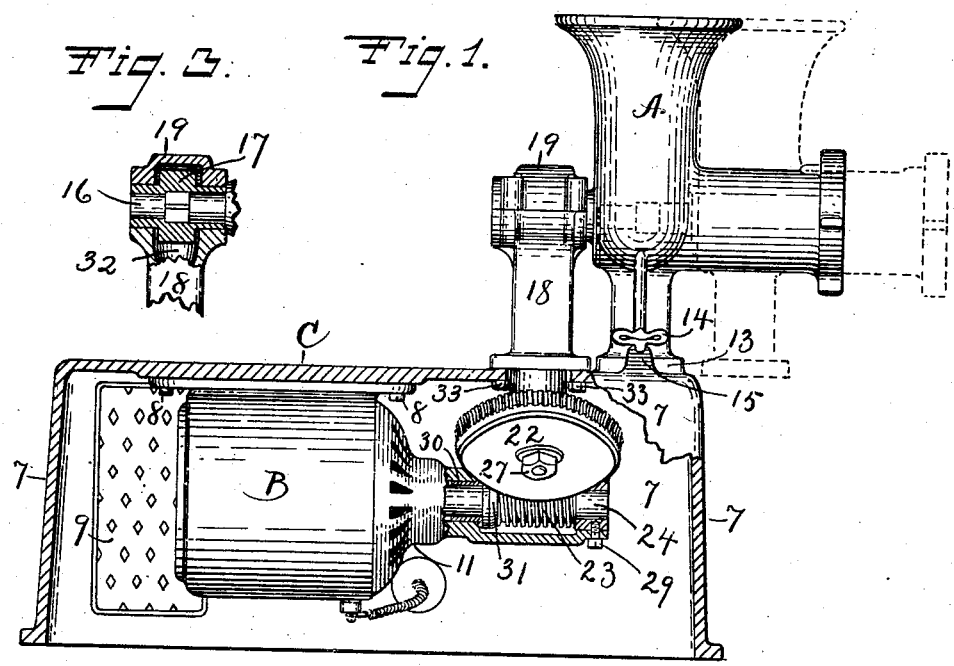
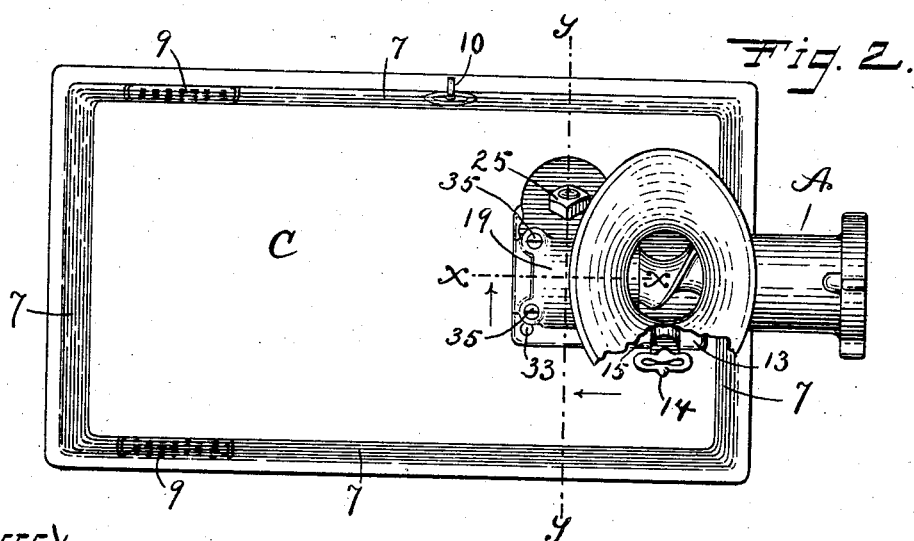
Witnesses.
S. H. Clark
N. L. Lockwood
Inventors
Herbert W. Spellman.
Clarence E. Olmsted.
By Louis M. Schmidt
Atty.

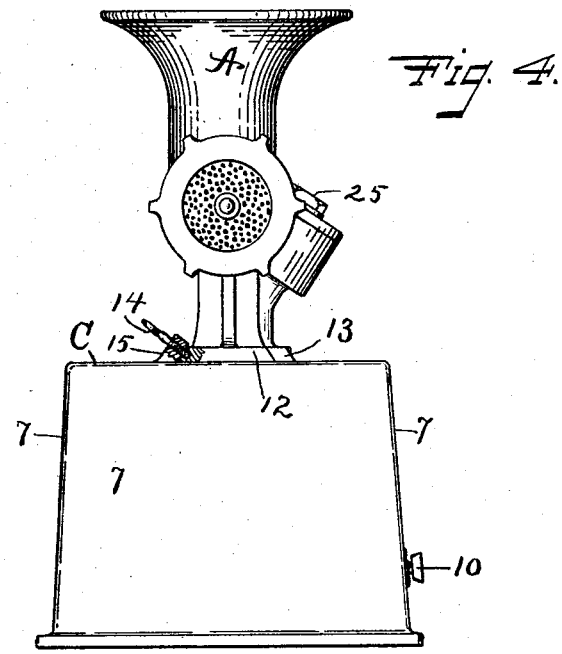
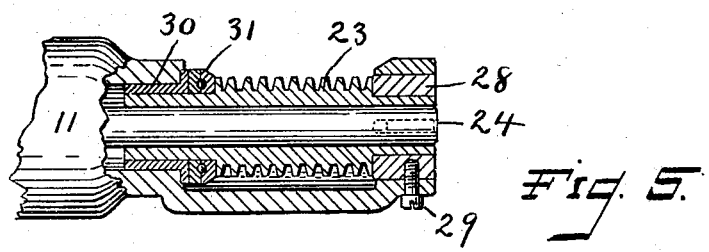

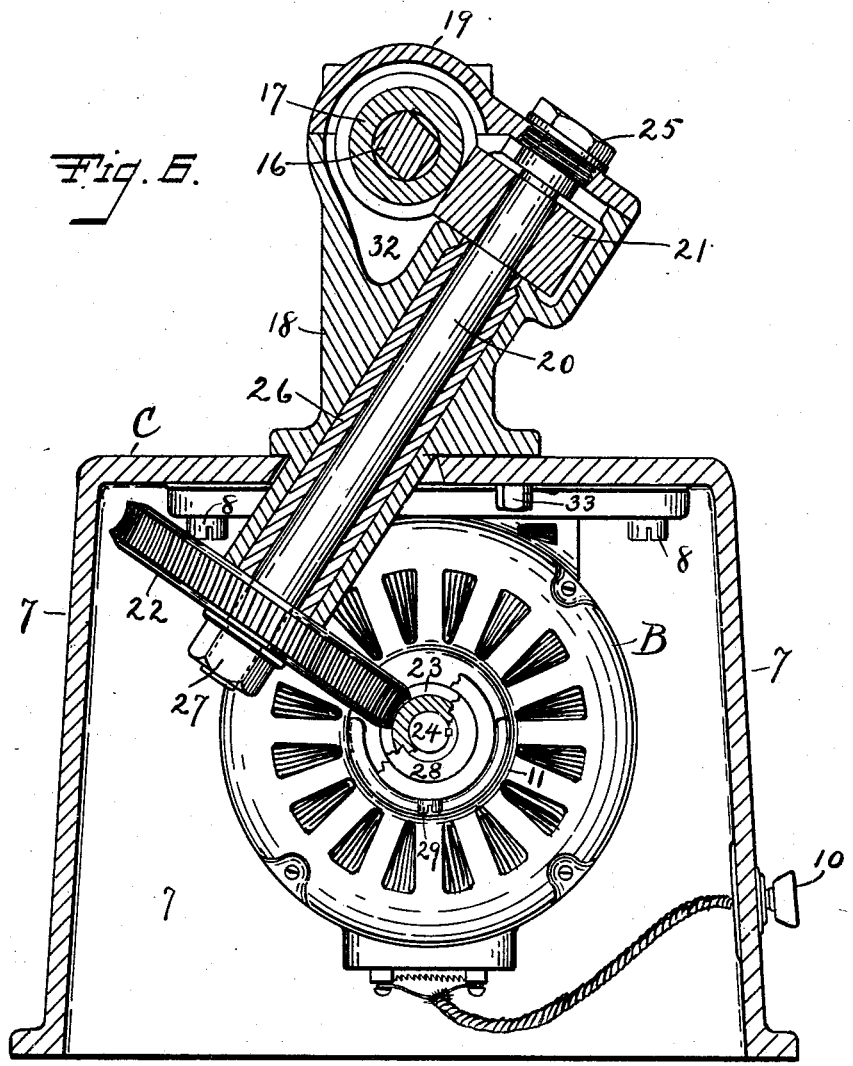

UNITED STATES PATENT OFFICE.

HERBERT W. SPELLMAN AND CLARENCE E. OLMSTED, OF NEW BRITAIN, CONNECTICUT, ASSIGNORS TO LANDERS, FRARY AND CLARK, OF NEW BRITAIN, CONNECTICUT, A CORPORATION.

POWER-TRANSMISSION MECHANISM.

969,214.      Specification of Letters Patent.      Patented Sept. 6, 1910.

Application filed March 18, 1909. Serial No. 484,123.

*To all whom it may concern:*

Be it known that we, HERBERT W. SPELLMAN and CLARENCE E. OLMSTED, citizens of the United States, and residing at New Britain, in the county of Hartford and State of Connecticut, have invented certain new and useful Improvements in Power-Transmission Mechanism, of which the following is a specification.

Our invention relates to improvements in electric meat cutters and the objects of our improvements are simplicity and economy in construction, and convenience and efficiency in use.

In the accompanying drawing: Figure 1 is a side elevation of our electric meat cutter, in part broken out and in section. Fig. 2 is a plan view of the same. Fig. 3 is a section of a part of the same on line $x\ x$ of Fig. 2. Fig. 4 is an end view of the same. Fig. 5 is a sectional view of a part of the motor on the line $x\ x$ Fig. 2 on an enlarged scale. Fig. 6 is a sectional view of our electric meat cutter on the line $y\ y$ of Fig. 2.

A is a meat cutter, B an electric motor and C is a base plate by which both are supported. The meat cutter A may be of any desired type. We prefer however, to use a meat cutter built in general on the lines of the one shown in the patent to Alonzo A. Warner, No. 908,714, Jan. 5, 1909, replacing the hand operation by electric operation after the manner to be described herewith. The electric motor B may likewise be of any general type, either direct current or alternating. We prefer however a type of motor such as are found standard on the market adapted to be mounted on the ceiling for reasons to be hereinafter disclosed.

The base plate C is the top plate of a box-like base and is essentially a flat horizontal rectangle. The sides of the said base are supporting flanges projecting downwardly from the said base plate C. The electric motor B is mounted essentially fixed and rigid in a so called inverted position to the underneath side of the said base plate C by any suitable means, such as the screws 8, the axis horizontal and essentially in the same vertical plane as the central line of the longest dimension of the rectangular base plate C. The said downwardly projecting flanges 7 serve as support for the entire apparatus and also as a lateral protection to the motor, and together with the base plate C form a complete inclosure therefor. Accordingly the motor may be of the so called open type as opposed to the closed type with the advantage of greater power capacity and at the same time will be fully and completely inclosed.

A hand hole closed by a cover 9 may be provided in the supporting flange 7 if desired for facilitating access to the motor, as might be desirable in the case of a direct current motor for the purpose of giving necessary attention to the commutator and brushes. Likewise any switches or rheostats necessary for the control of the electric motor B may be let into the supporting flanges 7. We prefer however, to use a single switch and rheostat combined operated by a single button or handle 10, the same being fully inclosed so far as exposure of the exterior is concerned and so mounted in the said flange 7 as not to vitiate the inclosed feature of the motor as has been described. The ordinary rear bearing support of the motor B is replaced by a special rear bearing support 11 to be hereinafter described.

The meat cutter A is complete and self contained so far as applies to the strictly cutting mechanism and is supported on a pedestal provided with a flanged foot 12 which fits with a dovetail joint in the side flanges or guides 13 made integral with the upper side of the base plate C by means of which it is removably mounted on the said upper side of the said base plate C and is held in place by means of a single locking screw 14 screwed through a boss 15 on one of the guides 13, the end bearing against a socket in one side of the said flanged foot 12, the said socket affording a means of determining the correct location of the meat cutter A for proper conditions of operation and also insuring the rigidity and reliability of the same with a minimum of pressure. The said locking screw 14 is the only feature requiring attention so far as tightening and loosening is concerned for the purpose of fixing the meat cutter A in position for the purpose of operating or for removing the same.

The feature of removably coupling the meat cutter A to the driving mechanism is effected by forming the end of the shaft 16 after the three section arrangement shown in the patent referred to consisting essentially of an inner cylindrical section of full size, the second section with the sides squared, and the third, outermost section cylindrical and of reduced diameter, and providing a hollow driving gear 17 for the said shaft with three corresponding sections to fit. The cylindrical sections insure proper alinement while the squared section insures the union of the two parts for the transmission of rotary motion. Accordingly, no set screws or special tightening devices are necessary and at the same time the parts are removably united. The said driving gear 17 has on the outside also three sections consisting of the gear proper in the middle, with two cylindrical bearing portions, one on each side, adapted to run in the bearings provided in the bracket 18 and cap 19 for the same. The inner side walls of the said bearings in the said bracket 18 and cap 19 prevent the displacement either laterally or in any other way of the driving gear 17 while the end of the shaft 16 of the meat cutter A is being removed from or replaced within the said driving gear 17.

Although the meat cutter A is removably mounted on the base plate C and readily connected to and disconnected from the driving mechanism as has been described, the same is during operation essentially directly connected to the motor by means of a train of suitable gearing comprising a pair of preferably so called spiral gears at the meat cutter end and a worm wheel 22 and worm 23 at the motor end, with a short counter shaft or gear shaft 20 between. The said spiral gears comprise a spiral gear 21, mounted at the upper end of the said driving shaft 20 which meshes with the driving gear 17 already described. The said worm wheel 22 is mounted at the lower end of the said counter shaft 20 and is driven by a worm 23 mounted directly on the motor shaft 24. The said counter shaft 20 is mounted within the said bracket 18, the upper end running within the bearing screw 25. The main bearing however for the said counter shaft 20 is the relatively long bearing 26 along the central portion of its length, which is made of babbitt and extends the entire length of the said shaft 20 between the said spiral gear 21 at the upper end and the said worm wheel 22 at the lower end. The said spiral gear 21 and the said worm wheel 22 are keyed to the shaft 20 in any ordinary manner, the worm wheel 22 being removably held in position by the nut 27 at the lower end of the shaft 20. The worm 23 is mounted on the motor shaft 24, so as to be free to move longitudinally along the same in any ordinary manner as by means of a feather and slot.

Integral with the worm 23 on each side of the worm proper are provided cylindrical bearing portions which serve as the bearings for the rear end of the motor shaft 24 so far as ordinary rotative motion is concerned, suitable bearings for the same being mounted in the bearing frame 11 of the motor B, the outer bearing 28 consisting essentially of a cylindrical collar held in place by a set screw 29, whereas the inner bearing 30 has an outwardly extending annular flange, between which flange and the worm 23 is placed a thrust bearing consisting of a complete ball bearing 31. The outer diameter of the said cylindrical collar comprising the outer bearing 28, as shown in Fig. 5, is not less than the outer diameter of the said worm 23.

Compactness of construction is secured by having the shafts of the electric motor and the meat cutter, parallel and in a plane at a slight angle from the vertical, and arranging the gear shaft in a vertical plane at right angles to the plane in which the shafts of the motor and meat cutter are located and diagonally across the same, the spiral gear at the upper end of the gear shaft on one side and the worm wheel at the lower end of the gear shaft on the other side, and this is the construction which we prefer. In special cases however a different arrangement from that described may be more suitable, as for instance, with the spiral gear and the worm wheel on the same side of the plane of the motor and meat cutter shafts, and also with the gear shaft vertical. The said bracket 18, carrying the bearings for the driving gear 17 and the gear shaft 20, has a pocket 32 for oil or grease, and is mounted on the base plate C by means of screws 33, passing upwardly through the said base plate C, and together with the cap 19 attached thereto by the screws 35 effectively incloses the entire driving mechanism above the base plate C. Combined with the protection afforded for the motor by the base plate C and its downwardly projecting protecting flanges, the entire exterior of the driving mechanism is completely concealed, and protected against liability to injury or accident and has advantages from a sanitary standpoint, both as regards features of dust and dirt agitated by the driving mechanism and from the facility for cleaning the exterior. If desired it is safe to turn a hose on the exterior or resort to other vigorous methods for cleaning the same.

While in the description of the apparatus given herewith a meat cutter has been included as one of the elements, it is apparent from the fact that the said meat cutter is essentially complete and self contained and removably mounted in operative position that the same motive and driving mechanism may be employed to drive any other complete and self contained machine or apparatus adapted to replace the said meat cutter, either temporarily or permanently. It is our purpose to have the same so employed in connection with apparatus in cases where there may be reasonable objection to the exposure of power and transmission mechanism whether from the standpoint of danger to operatives, for sanitary reasons, or on the grounds of nuisance or for whatsoever the reason may be. Particularly we have in mind the use of the same for driving coffee mills and for driving domestic machinery such as may be used in the kitchen or laundry.

We claim as our invention:

1. In combination, a power transmission mechanism comprising a base plate and transmission gearing, a machine, and a locking screw, said base plate being provided with a threaded hole adapted to receive said locking screw, said machine being provided with a recess adapted to register and engage with the said locking screw and thereby secure said machine to said base.

2. In a power transmission mechanism, a base plate adapted to receive a motor on the bottom side and a machine on the top side having their axes of revolution in the same plane, and transmission gearing adapted to operatively connect said motor and said machine, and comprising a counter shaft constituting a part of said gearing and located diagonally across said plane.

3. In a power transmission mechanism, gearing, and a shaft, the end of said shaft having three parts, respectively an inner cylindrical part of relatively large diameter, an intermediate part with squared sides, and an outer cylindrical part of small diameter, the said gearing adapted to receive the said end of said shaft and engage with the said part with squared sides.

4. In a power transmission mechanism, a hollow driving gear, the hollow interior of which has three parts respectively an outer cylindrical part of relatively large diameter, an intermediate part with squared sides and an inner cylindrical part of relatively small diameter.

5. In a power transmission gearing, a driving gear comprising a shell-like structure having an exterior made up of three parts, respectively two cylindrical bearing parts, one at each end, and a gear proper intermediate thereto, and having an interior provided with means for operative connection with a shaft.

6. In a power transmission mechanism, a base, a pair of gears comprising a driven gear and an intermediate gear, the said driven gear having bearings, a counter shaft having ends, bearings intermediate the said ends, the said intermediate gear being located at one of said ends, a worm wheel at the other of the said ends, and a bracket, the said bracket serving as a complete means of support for all of said bearings.

7. In combination a motor, a power transmission mechanism comprising a horizontal base plate provided with lateral flanges, a bracket mounted on said base plate, a cap for said bracket, a countershaft passing diagonally through said base plate, means for mounting said motor on the bottom of said base plate and within said flanges, a driving gear above said base plate and means for coöperating with said countershaft to connect the motor and driving gear, the said driving gear and the upper end of said countershaft being inclosed by said bracket and cap.

8. A power transmission mechanism comprising a worm and bearings therefor, said worm being adapted to receive a shaft and having exteriorly three parts comprising respectively the worm part proper interposed between cylindrical bearing parts at the ends, said bearings fitting said cylindrical bearing parts, one of said bearings being annular in exterior formation, removable and of outside diameter not less than the extreme diameter of the said worm part proper.

9. In combination, a power transmission mechanism and a motor having bearings, said power transmission mechanism having a worm adapted to receive internally the shaft of said motor and provided at its ends with cylindrical bearing parts and bearings for said cylindrical bearing parts, the said latter bearings being adapted to serve as said bearings for said motor shaft.

10. In a power transmission mechanism a worm, a thrust ball bearing, a removable axial bearing and a bearing supporting bracket, the said worm having a cylindrical end adapted to be received by the said ball bearing and to fit and run in said removable axial bearing, the said removable bearing having a cylindrical body and a flanged end, the said cylindrical body fitting and adapted to be received by the said bracket with the said flanged end in abutment between the same and the said ball bearing.

11. In combination with a motor, a machine and power transmission mechanism comprising means for operatively connecting and for disconnecting said motor and said machine, means for inclosing said motor and mechanism, said means being essentially permanent and fixed and permitting freely and unrestrictedly such operative connection and disconnection of said motor and machine as desired, and comprising a base, a bracket and a cap.

HERBERT W. SPELLMAN.
      CLARENCE E. OLMSTED.

Witnesses:
  P. V. GUIBERSON,
  R. T. COWAN.